(12) United States Patent
Voss et al.

(10) Patent No.: US 7,244,080 B2
(45) Date of Patent: Jul. 17, 2007

(54) QUICK-CHANGE INSERT FOR TOOLS, ESPECIALLY FOR THREAD DRILLS

(75) Inventors: Michael Voss, Leonberg (DE); Gerhard Babel, Baltmannsweiler (DE)

(73) Assignee: Bilz Werkzeugfabrik GmbH & Co. KG, Ostfildern (DE)

( * ) Notice: Subject to any disclaimer, the term of this patent is extended or adjusted under 35 U.S.C. 154(b) by 0 days.

(21) Appl. No.: 11/039,218

(22) Filed: Jan. 19, 2005

(65) Prior Publication Data

US 2005/0244234 A1 Nov. 3, 2005

(30) Foreign Application Priority Data

Apr. 29, 2004 (DE) .................. 10 2004 021 082

(51) Int. Cl.
*B23Q 11/10* (2006.01)
(52) U.S. Cl. .................. 408/57; 408/59; 408/239 R; 279/20
(58) Field of Classification Search .................. 279/20; 408/56, 57, 59, 239 R, 239 A; 407/11; 409/136; B23B 51/06; B23Q 11/10
See application file for complete search history.

(56) References Cited

U.S. PATENT DOCUMENTS

| | | | | |
|---|---|---|---|---|
| 2,470,218 | A | | 5/1949 | McNamara |
| 3,985,367 | A | * | 10/1976 | Martino et al. .................. 279/20 |
| 4,640,652 | A | * | 2/1987 | Rivera, Jr. .................. 409/136 |
| 5,152,541 | A | * | 10/1992 | Baumgartner et al. .......... 279/8 |
| 5,405,220 | A | * | 4/1995 | Ishikawa .................. 408/56 |
| 5,674,031 | A | * | 10/1997 | Bilz et al. .................. 408/6 |
| 5,807,038 | A | * | 9/1998 | Skinner .................. 408/204 |
| 6,135,679 | A | | 10/2000 | Kazda |
| 6,305,696 | B1 | * | 10/2001 | Sugata et al. .................. 279/20 |
| 6,435,232 | B2 | | 8/2002 | Tanigawa |

FOREIGN PATENT DOCUMENTS

| | | | |
|---|---|---|---|
| DE | 42 18 237 A1 | | 12/1993 |
| DE | 198 35 677 A1 | | 1/2000 |
| DE | 101 13 533 A1 | | 1/2002 |
| EP | 464335 A2 | * | 1/1992 |
| EP | 0956919 | | 11/1999 |
| EP | 0 956 919 B1 | | 11/2001 |
| EP | 1393852 | | 3/2004 |
| JP | 03117533 A | * | 5/1991 |
| JP | 2001162198 A | * | 6/2001 |
| JP | 2001322050 A | * | 11/2001 |
| JP | 2002028837 A | * | 1/2002 |
| SU | 1346353 A | * | 10/1987 |
| SU | 1357152 A | * | 12/1987 |

* cited by examiner

*Primary Examiner*—Monica Carter
*Assistant Examiner*—J Williams
(74) *Attorney, Agent, or Firm*—Michael J. Striker

(57) ABSTRACT

The present invention relates to a quick-change insert (10) for tools (11), in particular thread drills (12), for minimal lubrication, that is designed for detachable installation in a chuck (30) provided with a central lubricant channel (32) and for introducing the lubricant as an aerosol from the lubricant channel (32) into the rear end of a longitudinal bore (14) of an inserted tool (11). A sealing body (40) provided with a central passage (41) is located in a rear receptacle (25) of the insert body (17) such that, when the tool (11) is inserted and installed in the chuck (30), it connects the lubricant channel (32) and the longitudinal bore (14) of the tool (11) with each other in an at least substantially leakproof manner.

3 Claims, 1 Drawing Sheet

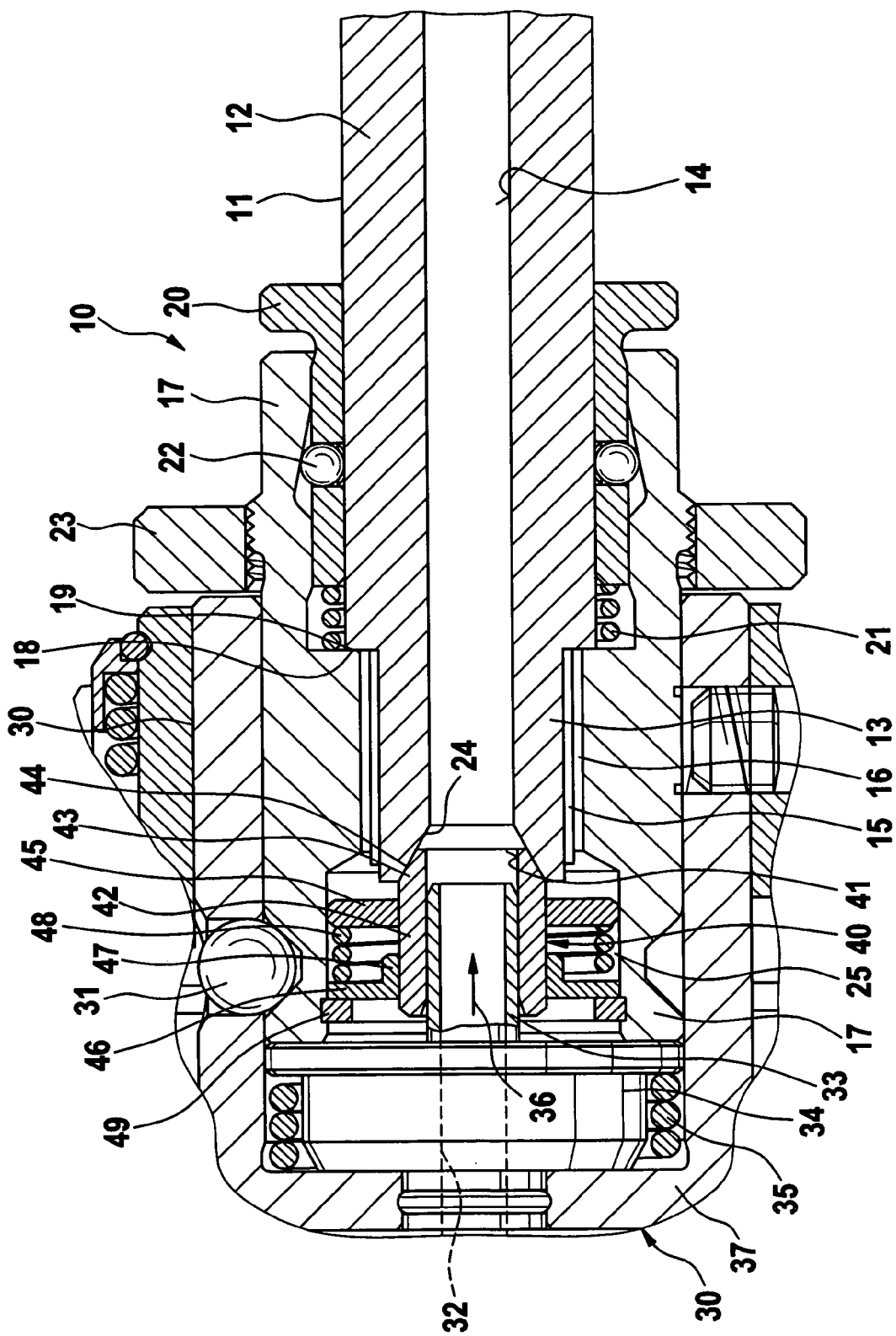

QUICK-CHANGE INSERT FOR TOOLS, ESPECIALLY FOR THREAD DRILLS

CROSS-REFERENCE

The invention described and claimed hereinbelow is also described in German Patent Application DE 10 2004 021 082.9, filed Apr. 29, 2004. This German Patent Application, whose subject matter is incorporated here by reference, provides the basis for a claim of priority of invention under 35 U.S.C. 119(a)-(d).

BACKGROUND OF THE INVENTION

The present invention relates to a quick-change insert for tools, in particular for thread drills.

A quick-change insert of this type is known (EP 0 956 919 B1) that is capable of being installed in a thread-cutting chuck for minimal lubrication and, in fact, in an insertion bush of this chuck. The thread-cutting chuck is designed for minimal lubrication and, to this end, is equipped with an axially central lubricant passage for connecting the insertion bush with a machine-side minimal lubrication source, from which the lubricant is guided as an aerosol to the longitudinal bore of the tool. In its opening region into the insertion bush of the chuck, the lubricant channel includes an axially displaceable coolant tube which produces a direct connection with the longitudinal bore of the tool. The coolant tube—extending as one part continuously from the lubricant supply channel of the chuck to the thread drill—is capable of being displaced in the insertion bush of the chuck by the pressure of the aerosol and/or an axially-acting spring and, as a result, independent of the axial position of the tool, is pressed into an engagement position with said tool and, in fact, in the longitudinal bore of the tool. Due to the ability of the coolant tube in the chuck to be slid axially to the quick-change insert and the rear end of the tool, the coolant tube adapts to rear ends of the tools having different lengths. The ability of thread-cutting chucks of this type to adapt to shank ends of tools having different lengths and to quick-change inserts having different lengths is limited, however.

SUMMARY OF THE INVENTION

The present invention is based on the task of realizing a minimum lubrication of tools, in particular thread drills, that are held in thread-cutting chucks using quick-change inserts, with quick-change inserts having any length and to hereby increase the reliability of clamping in the region of the quick-change inserts.

The task is attained with a quick-change insert of the type stated initially in accordance with the invention.

Due to the fact that the quick-change insert is provided with a sealing body containing a central passage in a rear receptacle of its insert body, the sealing body producing the connection between the chuck-side lubricant channel and the lubricant bore of the particular tool that is retained in the quick-change insert, a central, closed and leakproof guidance of lubricant in the form of aerosol from the chuck to the tool is created in a simple manner, whereby rear ends of tools having different lengths are already accommodated in the quick-change insert by the automatic adjustment of the sealing body. If necessary, quick-change inserts having different sizes can be kept on hand, the quick-change inserts fitting in the same chuck but enabling an inner adaptation to different-length rear ends of receiving tools. Effort has been simplified and reduced due to the present invention. As a result of the resilient pressing of the sealing body to the shank end of the tool, the sealing body results in simultaneous clamping of the tool in the quick-change insert, thereby increasing the reliability of the clamping.

BRIEF DESCRIPTION OF THE DRAWINGS

FIG. 1 shows a schematic axial sectional drawing of a quick-change insert for tools that is inserted in a chuck, only part of which is shown.

DETAILED DESCRIPTION OF THE PREFERRED EMBODIMENTS

Quick-change insert 10 shown contains a tool 11, in particular a thread drill 12, which is inserted axially in quick-change insert 10 with its rear end 13 first and contains a longitudinal bore 14 for passage of a lubricant, in the form of an aerosol in particular. Tool 11 is squared 15 on the end and is accommodated via this squared configuration in a corresponding square-shaped receptacle 16 of an insert body 17 of quick-change insert 10 in a torque-transferring manner. Via an annular shoulder 18, tool 11 bears axially against a corresponding surface 19 of insert body 17. A ball bush 20 accommodated on the right (as shown in the drawing) end of insert body 17 is pressed toward the right (as shown in the drawing) by a spring 21 such that balls 22 contained in ball bush 20 are pressed radially inwardly by conical surfaces 23 that taper toward the right (as shown in the drawing) and are pressed onto the outer circumferential surface of tool 11, by way of which the tool is held captive axially in quick-change insert 10.

Quick-change insert 10 is accommodated in replaceable fashion in a chuck 30 and retained via balls 31. Chuck 30—as well quick-change insert 10—is designed for minimal lubrication and contains a central lubricant passage 32, via which the lubricant is guided as an aerosol—which is supplied from a machine spindle (not shown), for example—through chuck 30. Part of lubricant channel 32 is a visible, chuck-side tube part 33. This tube part 33 is guided through a schematically indicated ejector 34 that is acted upon by a spring 35 in the direction of arrow 36. A retaining ring 23 is mounted on quick-change insert 10.

Quick-change insert 10 is designed to be detachably accommodated in chuck 30 and to introduce the aerosol guided through lubricant channel 32 from lubricant channel 32 into the longitudinal bore 14 of tool 11, the longitudinal bore opening into rear end 13, whereby longitudinal bore 14, in rear end 13, opens into an expansion 24 that expands nearly in the shape of a truncated cone against the direction of arrow 36. In this region, which is adjacent to expansion 24, insert body 17 includes a nearly annular receptacle 25. A sealing body 40 is located in this rear receptacle 25 of insert body 17, the sealing body being provided with a central passage 41. Sealing body 40 is located such that, when tool 11 is inserted and installed in chuck 30, it connects lubricant channel 32 and longitudinal bore 14 of tool 11 in an at least substantially leakproof manner. This connection takes place such that only slight diameter changes occur along the path of the aerosol from lubricant channel 32 through sealing body 40 to longitudinal bore 14.

Sealing body 40 is retained in an axially moveable manner in receptacle 25 of insert body 17, and is guided in an axially displaceable manner in particular. Sealing body 40 includes a sleeve 42 and is configured as a cylindrical tube part, for example, whereby passage 41 is configured as a throughway axial bore, the diameter of which is less than or equal to the diameter of longitudinal bore 14 of tool 11. When quick-change insert 10 is inserted in chuck 30 as shown in the drawing and is accommodated therein such that it is ready for operation, sealing body 40 is penetrated by chuck-side tube part 33 in a longitudinal section of its passage 41, the tube part engaging in this passage 41 when quick-change insert 10 is inserted. Sealing body 40—with sleeve end 43 facing rear end 13 of tool 11—is capable of being brought in contact with this end of tool 11 and, in fact, either with a tool-side end face (not shown) or, instead, with the conical surface of expansion 24 on shank end of tool 11. For alignment purposes, sleeve end 43 has a nearly truncated cone-shaped outer surface 44.

Sealing body 40, in particular its sleeve 42, includes a radially projecting, integral annular part 45, that can serve to center sealing body 40 inside receptacle 25. A guide part 46 is further retained in receptacle 25 of insert body 17 to axially guide sealing body 40, the guide part being configured as a ring with a central guide sleeve 47. Guide sleeve 47 is slidably positioned on sealing body 40 and on sleeve 42 in particular, and is penetrated by the same.

Sealing body 40 is capable of being pressed onto the facing shank end of tool 11 in a resilient manner and, when a tool 11 is inserted, as shown, it is pressed on. At least one axially acting spring 48, e.g., in the form of a cylindrical coil spring, is used for this purpose. Spring 48 bears with one end against insert body 17 and, with its other end, acts on sealing body 40 in the direction of arrow 36, i.e., in the direction of shank end of tool 11. In the exemplary embodiment shown, spring 48 bears against annular part 45 at one end and on guide part 46 at the other end, whereby guide part 46 is axially supported on insert body 17 by a retaining means 49, e.g., a retaining ring. The pressing of sealing body 40 against shank end of tool 11 increases the clamping force of balls 22; this ensures highly reliable clamping particularly when tool 11 vibrates and when tools with hard-metal shanks are used.

Relative to chuck 30, quick-change insert 10 is a separate, replaceable component. When a tool 11 is not inserted in quick-change insert 10, sealing body 40 is displaced by spring 48 in the direction of arrow 36 to the point where sealing body 40 with annular part 45 bears against the right (as shown in the drawing) end of inner receptacle 25 of insert body 17. Sealing body 40 is therefore held captive in insert body 17. When a tool 11, e.g., a thread drill 12, is inserted with its shank in quick-change insert 10, its reverse nearly truncated cone-shaped expansion 24 at the end of longitudinal bore 14 comes in contact with the nearly truncated cone-shaped outer surface 44 on sleeve end 43, whereby, if tool 11 is inserted into insert body 17 further, sealing body 40 is displaced to the left (as shown in the drawing) against the direction of arrow 36 and the action of spring 48, e.g., until annular shoulder 18 bears against surface 19. Inserted tool 11 is then held captive axially in quick-change insert 10 via balls 22 in ball bush 20, whereby torque can be transmitted via squared configuration 15 and square-shaped receptacle 16. If quick-change insert 10 is then inserted in chuck 30, insert body 17 is accommodated by chuck body 37 and locked in place therein by way of balls 31. Tube part 33 engages axially in passage 41 of sealing body 40. Spring 35 of ejector 34 is compressed accordingly.

To remove quick-change insert 10 from chuck 30, balls 31 are released in the usual manner, so they disengage. As a result of spring 35 decompressing and using ejector 34, quick-change insert 10 is ejected at least slightly in the direction of arrow 36 and can then be removed from chuck body 37. To remove tool 11, ball bush 20 is pressed inward against the direction of arrow 36 until its balls 22 can move radially outward; this disengages tool 11, which can then be removed. Sealing body 40 is slid into the starting position in the direction of arrow 36 via action of spring 48.

Quick-change insert 10 can accommodate tools 11 having squared configurations 15 with different lengths, whereby, due to the resilience of sealing body 40, it is pressed tightly—with corresponding axial compensation via spring 48—with outer surface 44 against the reverse nearly truncated cone-shaped expansion 24 of tool 11. As a result, a leakproof transition is obtained with a minimal change in diameter from lubricant channel 32—and in tube part 33—to passage 41 and, from here, to longitudinal bore 14 of tool 11. The requirement is therefore taken into account that the aerosol—which functions as lubricant for minimal lubrication—must be guided into tool 11 and through tool 11 in the straightest line possible with the most constant diameter of passage channels possible. It is also an advantage that the aerosol is introduced directly into longitudinal bore 14 of tool 11 and need not be first introduced into the region of the receptacle. Sealing body 40 therefore serves to guide the aerosol through in the most leakproof manner possible with axial adaptability, and simultaneously fulfills the function of a corresponding axial guide element.

The invention claimed is:

1. A quick-change insert for tools for minimal lubrication, that is designed for detachable mounting in a chuck (30) provided with a central lubricant channel (32) and for introducing the lubricant as an aerosol from the lubricant channel (32) into the rear end of a longitudinal bore (14) of an inserted tool (11), wherein a sealing body (40) is provided having a sleeve (42) and a central passage (41), wherein said sealing body (40) is located in a rear receptacle (25) of the insert body (17) such that, when the tool (11) is inserted and installed in the chuck (30), said sleeve (42) with an end (43) assigned to the rear end (13) of the tool (11), is capable of being brought into contact with the tool (11) and connects the lubricant channel (32) and the longitudinal bore (14) of the tool (11) with each other in an at least substantially leakproof manner, wherein the sealing body (40) is axially displaceably guided in the receptacle (25), and wherein the sealing body (40) is capable of being pressed in a resilient manner against the shank end of the tool (11) by means of at least one spring (48) that bears with one end indirectly against the insert body (17) and, with its other end, acts on the sealing body (40) in the direction of the shank end of the tool (11), wherein the sleeve (42) includes a radially projecting annular part (45) that performs a centering function inside the receptacle (25) of the insert body (17), wherein the one sleeve end (43) includes a nearly truncated cone-shaped outer surface (44) and is capable of being moved into a corresponding reverse nearly truncated cone-shaped expansion (24) of the rear end of the longitudinal bore (14) of the tool (11), wherein said sleeve (42), when installed in the chuck (30), is capable of being penetrated by a chuck-side tube part (33) of the lubricant channel (32) in a longitudinal section of its passage (41), wherein a guide part (46) is retained in the receptacle (25) of the insert body (17), by way of which the sleeve (42) is guided in an axially displaceable manner, wherein the guide part (46) includes a guide sleeve (47) centered radially in the receptacle (25) of the insert body (17), the guide sleeve being positioned on the sleeve (42) and is penetrated by it, and wherein the at least one spring (48) is axially supported on the guide part (46), which is axially supported via a retaining means (49) on the insert body (17).

2. The quick-change insert as recited in claim 1, wherein the sleeve (42) is configured as a cylindrical tube part.

3. The quick-change insert as recited in claim 1, wherein said sleeve (42) includes a throughway axial bore as the passage (41) and the diameter of the passage (41)—in terms of the passage cross section, in particular the diameter—is smaller than or equal to the diameter of the longitudinal bore (14) of the tool (11).

* * * * *